United States Patent [19]
Dwyer

[11] Patent Number: 6,068,541
[45] Date of Patent: May 30, 2000

[54] METHOD FOR USING A FIXTURE ENABLING MORE ACCURATE MACHINING OF A PART

[75] Inventor: James P. Dwyer, Guilford, Conn.

[73] Assignee: United Technologies Corporation, Hartford, Conn.

[21] Appl. No.: 08/995,448

[22] Filed: Dec. 22, 1997

[51] Int. Cl.$^7$ ........................................................ B24B 1/00
[52] U.S. Cl. ........................... 451/28; 269/296; 451/387; 451/405
[58] Field of Search .................. 29/889.7, 889.72; 269/296; 451/28, 365, 369, 387, 403, 405

[56] References Cited

U.S. PATENT DOCUMENTS

| | | | |
|---|---|---|---|
| 2,088,359 | 7/1937 | Albertson | ............................. 451/369 X |
| 2,577,747 | 12/1951 | Gibian . | |
| 3,145,512 | 8/1964 | Hirchert | .................................. 451/369 |
| 3,818,646 | 6/1974 | Peterson . | |
| 4,016,683 | 4/1977 | Cretella . | |
| 4,589,175 | 5/1986 | Arrigoni . | |
| 4,638,602 | 1/1987 | Cavalieri . | |
| 4,805,351 | 2/1989 | Dobson et al. . | |
| 4,829,720 | 5/1989 | Cavalieri . | |
| 5,222,330 | 6/1993 | Krol | ..................................... 451/369 X |
| 5,230,183 | 7/1993 | Wagner, Jr. . | |
| 5,275,536 | 1/1994 | Stephens et al. . | |
| 5,377,456 | 1/1995 | Dixon | .................................. 451/387 X |

FOREIGN PATENT DOCUMENTS

| | | |
|---|---|---|
| 0 436 933 A2 | 7/1991 | European Pat. Off. . |
| 1025881 | 4/1953 | France . |
| 2238607 | 8/1972 | Germany . |
| 2047897 | 12/1980 | United Kingdom . |

*Primary Examiner*—Timothy V. Eley

[57] ABSTRACT

A fixture securely holds a blank having at least two spaced apart locators. The fixture has a base with spaced apart end walls, one supporting a clamping mechanism and the other supporting an abutment, at least one of which is free to pivot in relation to the end wall that supports it. Upon securing the blank into the fixture, the clamping mechanism mates with one of the locators on the blank and forces another of the locators into contact with the abutment. A method includes providing a blank having a least two spaced apart locators, providing a fixture having a base with two spaced apart end walls, one supporting a clamping mechanism and the other supporting an abutment, at least one of which is fee to pivot in relation to the end wall that supports it, and securing the bland into the fixture where in the clamping mechanism mates with one of the locators and forces another of the locators into contact with the abutment.

14 Claims, 5 Drawing Sheets

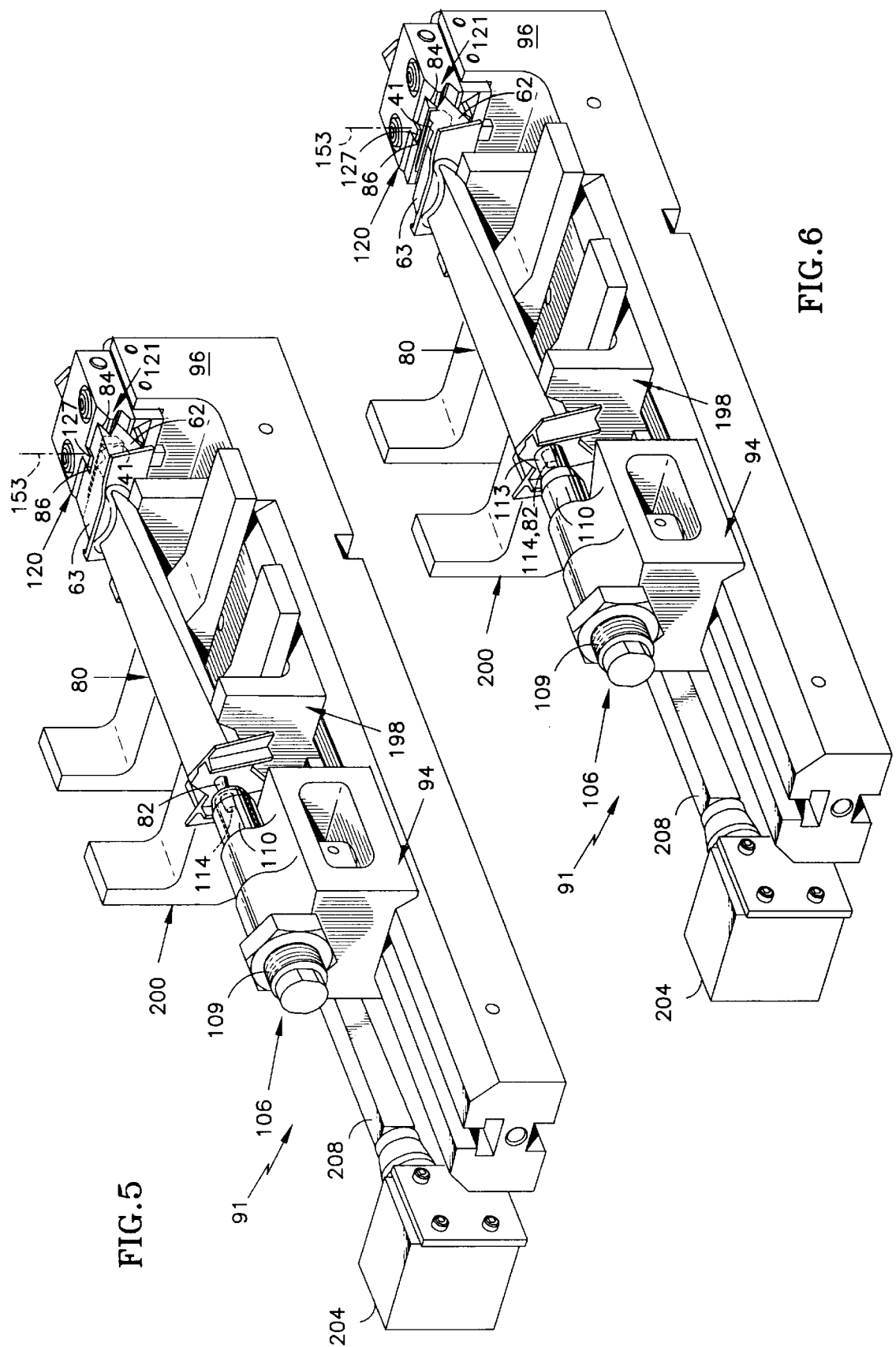

METHOD FOR USING A FIXTURE ENABLING MORE ACCURATE MACHINING OF A PART

The subject matter herein may be disclosed and/or claimed in U.S. Pat. No. 5,869,194, entitled "Blank for Manufacturing Precisely Shaped Parts and related copending applications Ser. No. 08/640,045, "A Fixture for Manufacturing Precisely Shaped Parts"; and Ser. No. 08/993,073, "A Method for Manufacturing Precisely Shaped Parts".

TECHNICAL FIELD

The present invention relates to precisely shaped parts, and more particularly to a fixture for manufacturing precisely shaped parts.

BACKGROUND OF THE INVENTION

Many industries use precisely shaped parts. For example, conventional blades for use in gas turbine engines must be precisely shaped. Typically, precision investment casting or die-forging forms a metal starting blank into a blank having a blade shape. Generally, the blank includes a tip, a root region longitudinally spaced therefrom, and a midspan region extending between the tip and the root region. The tip may include an attached or integral shroud. A number of details must be machined into these portions of the blank. For example, a plurality of dove tails must be machined into the root region. These dove tails allow the blade to be secured to the rotor disk in the engine. In order to achieve acceptable engine performance, these dove tails must be formed within small tolerances. To accomplish this, there must be references from which to measure the configuration of the dove tails, and a fixture for holding the blank during machining.

Reference is made to U.S. Pat. No. 2,577,747 issued to Gibian and U.S. Pat. No. 3,818,646 issued to Peterson. However, the method taught in Gibian is not sufficiently accurate and the method taught in Peterson requires complex fixturing which is expensive to design, manufacture and maintain. Furthermore, a different fixture is needed for different sized and shaped blades.

Reference is also made to a method of providing references that entails encapsulating the blank in a block of material, such as a low melt alloy. The block of material is formed around the blank, so that the root region extends from the block. The sides of the block provide reference planes from which the configuration of the dove tails or other details can be determined with the necessary accuracy. However, encapsulating the blank requires a complex encapsulation tool. Furthermore, after machining the dove tails, the material must be melted off the blank and must be disposed of without causing environmental problems.

To overcome the problems above, it is known to use a blank having a sacrificial region and three locators. The sacrificial region extends longitudinally from the root region. The three locators are shaped and positioned to mate with corresponding features on a fixture. One of the locators is a conical shaped projection disposed at the tip. The other two locators are machined notches in the sacrificial region, one rectangular shaped notch and one wedge shaped notch. The conical shaped projection and the rectangular shaped notch both lie within a plane containing a stacking axis. The wedge shaped notch has a corner aligned with the root centerline, perpendicular to the stacking axis.

The fixture has a U-shaped base with spaced apart end walls to accommodate the blank. One of the end walls supports a clamping mechanism having a conical bore. The other end wall supports an abutment having rectangular and wedge shaped projections. Actuating the clamping mechanism moves the conical bore into contact with the conical projection on the blank. This forces the notched locators into contact with the corresponding projections on the abutment to thereby position the blank within the fixture. The surfaces of the wedge shaped projection make substantial contact with corresponding surfaces of the wedge shaped notch. Such contact helps to prevent the blank from rotating during machining and enables the blank to be secured within the fixture using only a minimal amount of clamping force in the longitudinal direction. Details, such as dove tails in the root region, can then be accurately machined into the blank to form a precisely shaped part.

The blank and fixture described above are disclosed in related copending application Ser. No. 08/641,251, "A Blank for Manufacturing Precisely Shaped Parts"; and Ser. No. 08/640,045, "A Fixture for Manufacturing Precisely Shaped Parts". This approach enables the part to be machined with improved accuracy. It also eliminates the need for fixtures with complex clamping mechanisms and does not require encapsulation with low melt alloy. The fixture is relatively simple to manufacture and can be easily modified to accommodate different size or shaped blades.

However, better fixtures are always being sought. For example, with the blank and fixture above, a significantly greater amount of longitudinal clamping force must sometimes be applied in order to prevent the blank from rotating during machining. However, greater clamping forces can distort the blank while it is secured within the fixture. This can result in misalignment of the subsequently machined features. Large clamping forces also present a risk of permanently distorting the blank. Thus, a fixture that does not require significantly greater than desired clamping forces in order to secure the blank is sought.

SUMMARY

An object of the present invention is to provide an improved fixture.

Another object of the present invention is to provide a fixture that uses less clamping force to secure a blank having a plurality of locators.

Another object of the present invention is to provide a fixture that enables more accurate machining of a blank.

According to a first aspect of the present invention, a fixture for securing a blank having at least two spaced apart locators, includes a fixture having a U-shaped base with two spaced apart end walls, one supporting a clamping mechanism and the other supporting an abutment where at least one of the clamping mechanism and the abutment is free to pivot in relation to the end wall that supports it, wherein upon securing the blank into the fixture the clamping mechanism mates with one of the locators and forces another of the locators into contact with the abutment.

According to a second aspect of the present invention, a method includes providing a blank having at least two spaced apart locators, providing a fixture having a U-shaped base with two spaced apart end walls, one supporting a clamping mechanism and the other supporting an abutment where at least one of the clamping mechanism and the abutment is free to pivot in relation to the end wall that supports it, and securing the blank into the fixture wherein the clamping mechanism mates with one of the locators and forces another of the locators into contact with the abutment, and subsequently machining the blank.

It has been determined that due to limitations in manufacturing technology, there is inevitable imprecision in the machining process that forms the notch locators on the blanks. Thus, the wedge shaped notch may not be perfectly positioned on the blank, e.g., the corner of the wedge shaped notch may not be perfectly aligned with the root centerline, i.e., not perfectly perpendicular to the stacking axis. In such event, the previous fixture requires a greater amount of longitudinal clamping force to attain substantial contact between the surfaces of the wedge projection and the wedge shaped notch. In the absence of such contact, the surfaces may make contact in only a limited area and may not secure the blank.

By employing a pivotal attachment, the present invention enables better mating between a locator on the blank and a corresponding feature on the fixture. As a result, the fixture is able to secure the blank while imparting less clamping force on the blank that imparted by the previous fixture. The use of less clamping force reduces the likelihood that the blank will be distorted when it is secured in the fixture, and thereby reduces the likelihood of misalignment of subsequently machined features. It also reduces the risk of permanently distorting the blank. In the best mode embodiment, this is accomplished without disturbing the positioning or mating of the other locators, thereby ensuring that the blank is positioned as desired within the fixture.

BRIEF DESCRIPTION OF THE DRAWING

FIG. 4 is a perspective view of an abutment of the fixture of FIG. 2.

FIG. 5 is a perspective view of the fixture and the blank of FIG. 2 where the blank is resting on the fixture and the fixture is in the open position.

FIG. 6 is a perspective view of the fixture and the blank of FIG. 2 where the blank is secured within the fixture and one side of a root region on the blank has been machined.

BEST MODE FOR CARRYING OUT THE INVENTION

Figure 1:
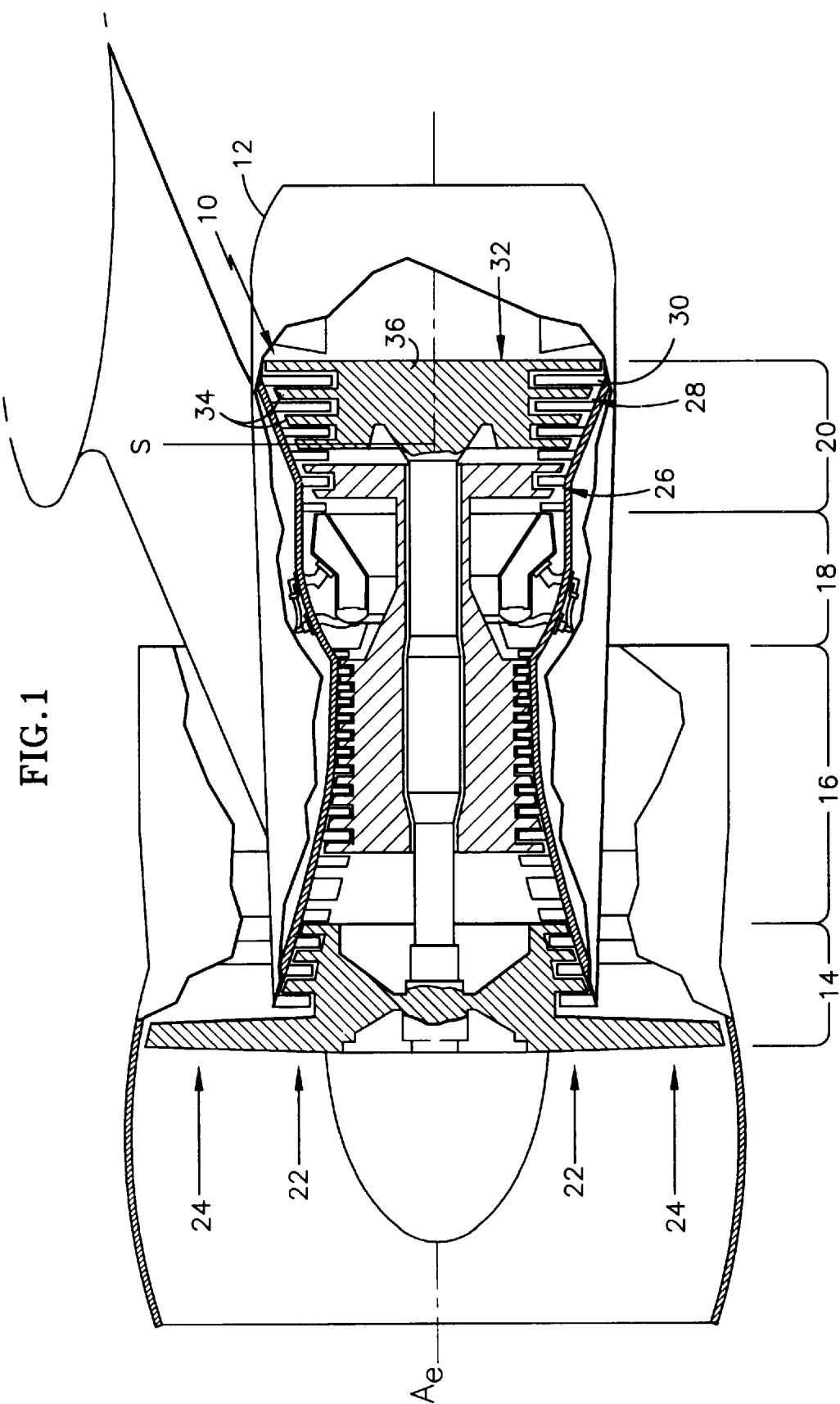
FIG. 1 is a side elevation schematic representation of an axial flow, turbofan gas turbine engine.

Referring to FIG. 1, an axial flow, turbofan gas turbine engine 10 is mounted in an aircraft nacelle 12. The nacelle 12 circumscribes the gas turbine engine 10. The engine comprises of a fan section 14, a compressor section 16, a combustor section 18, and a turbine section 20. An axis $A_c$ is centrally disposed within the engine, extending longitudinally therethrough. A primary flow path 22 for working medium gases extends longitudinally along the axis $A_c$. A secondary flow path 24 for working medium gases extends parallel to and radially outward of the primary flow path 22.

The turbine section 20 includes an upstream high pressure turbine 26 and a downstream low pressure turbine 28. For example, the low pressure turbine 28 is formed by a stator assembly 30 and a rotor assembly 32. The rotor assembly 32 has a plurality of airfoils or blades 34 which extend radially outward from a rotor disk 36 across the primary working medium flow path 22. Each blade 34 is characterized by a stacking axis S which extends perpendicular to the engine axis $A_c$.

Figure 2:
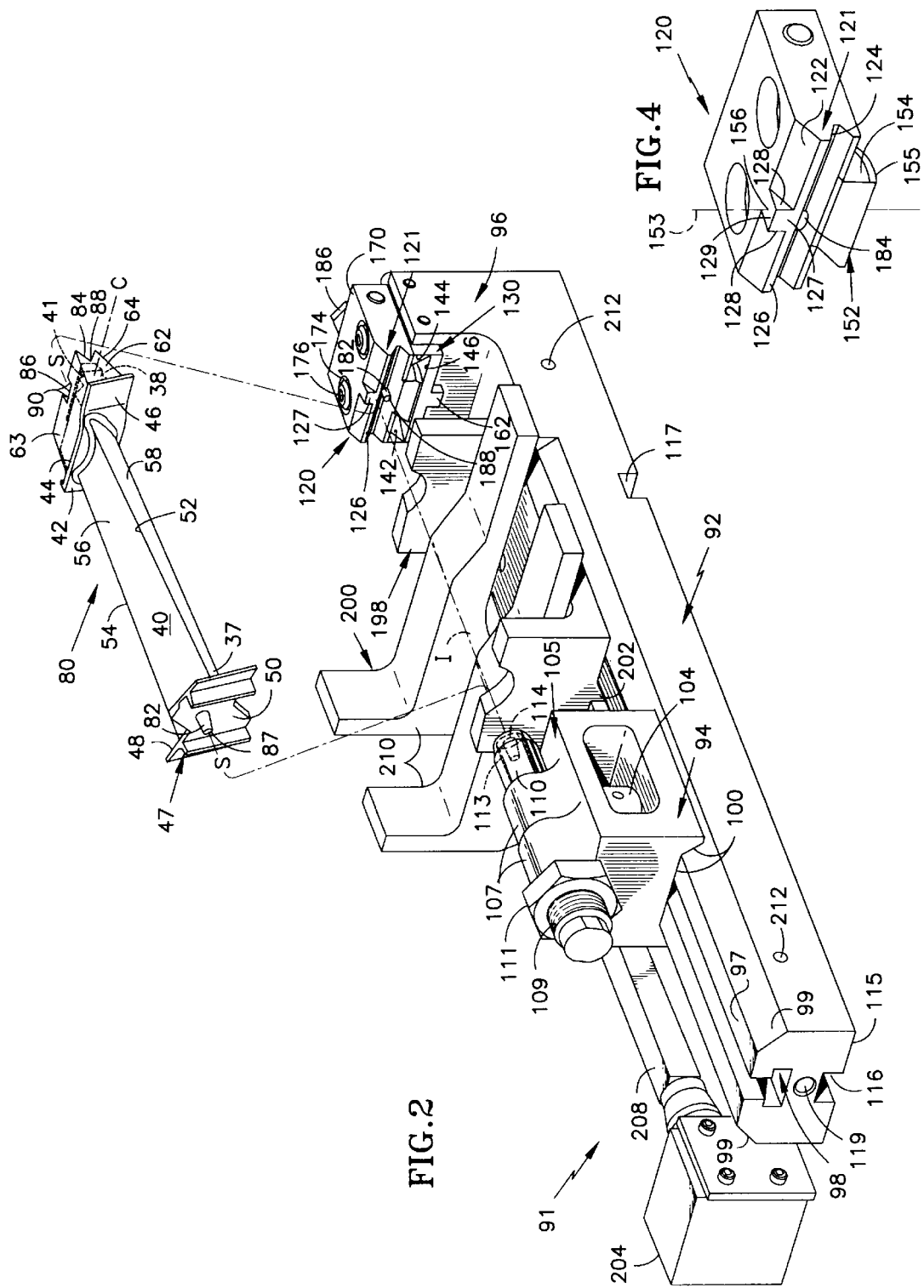
FIG. 2 is a perspective view of a best mode embodiment of a fixture of the present invention for use with a blank.

Referring to FIG. 2 a blank 80 from which the turbine blade 34 (FIG. 1) is formed generally has a tip 37, a root region 38 longitudinally spaced from the tip 37, and a midspan region 40 extending therebetween. A platform 42 separates the midspan region 40 from the root region 38. The platform 42 has an inner surface 44 adjacent the root region 38 and an opposed outer surface 46. The tip 37 further includes an integral shroud 47. The shroud 47 has an inner surface 48 adjacent the midspan region 40, and an opposed outer surface 50. The root region 38 includes a plurality of dovetails 41 by which the blade engages the rotor disk 36 (as shown in FIG. 1). The root region 38 further includes a root centerline C disposed centrally through the width of the root region 38. The midspan region includes a leading edge 52, a trailing edge 54 spaced from the leading edge, pressure surface 56, and a suction surface 58. The pressure and suction surfaces 56 and 58 extend between the leading and trailing edges 52 and 54.

The blank 80 further includes a sacrificial region 62. The sacrificial region 62 extends substantially longitudinally from the root region 38 (shown in phantom). The sacrificial region 62 includes a first surface 63, a second surface 64 spaced from the first surface 63, and a third surface (not shown) extending between the first and second surfaces 63 and 64, respectively.

The blank 80 is further characterized by first, second and third locators 82, 84, and 86, respectively. In this embodiment, the first locator 82 is a projection that extends from the radially outer surface 50 of the shroud 47. The projection preferably has a conical shape with a tip 87 and is disposed on the stacking axis S. The second and third locators 84 and 86, are machined into the blank 80 using wire electron discharge machining. The second and third locators 84, 86, in this embodiment, are each a notch. The second locator 84, is cut from the third surface (not shown) of the sacrificial region 62. The second locator 84 is preferably a triangular prism shaped notch with a corner 88 that is intersected by the stacking axis S and parallel to the root centerline C. The third locator 86 extends from the first surface 63 to the second surface 64 of the sacrificial region 62. The third locator 86 is preferably a rectangular shaped notch including vertical surfaces 90. The vertical surfaces 90 are equally spaced from the stacking axis S.

Figure 3:
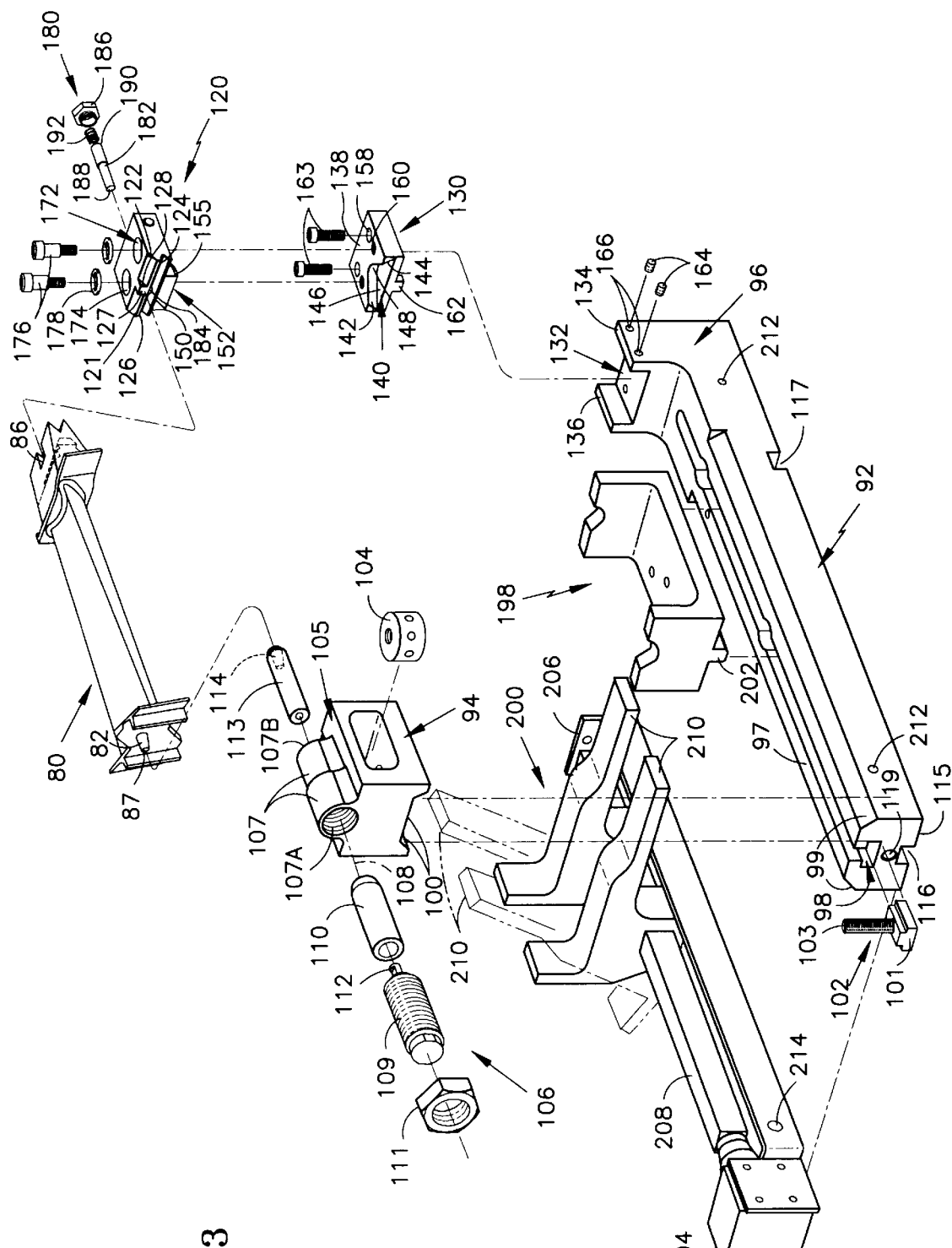
FIG. 3 is an exploded view of the fixture of FIG. 2

A fixture 91 for holding the blank 80 during subsequent machining includes a U-shaped base 92 with first and second end walls 94, 96 spaced apart to accommodate the blank 80 therebetween. The second end wall 96 is preferably integral to the base 92. The first end wall 94 is preferably slidably attached to the base 92 to enable adjustment of its position. To achieve this, the base includes an upper surface 97, two chamfered surfaces 99, and a T-shaped slot 98. The first end wall has a lower surface 100 and a hollowed interior. The lower surface 100 is shaped to provide clearance to the upper surface 97 of the base, and to register with and contact the chamfered surfaces 99 of the base. The T-shaped slot 98 receives one end 101 of a T-shaped retaining bolt 102 (FIG. 3). The bolt 102 (FIG. 3), has a threaded end 103 (FIG. 3) that protrudes through an opening (not shown) in the lower surface 100 of the first end wall 94 and into the hollowed interior. A retaining nut 104, e.g., a spanner nut with circumferentially spaced holes, is tightened onto the threaded end 103 of the bolt 102. The presence of only minimal clearance between the T-shaped bolt 102 and the T-shaped slot 98 ensures that the T-shaped 102 bolt does not turn while the retainer nut 104 is being tightened.

The first end wall further includes an upper portion 105 that supports a clamping mechanism 106. The upper portion 105 includes a first and a second passage 107A, 107B (FIG. 3) having a common axis 108 (FIG. 3). The diameter of the first passage 107A is greater than that of the second passage 107B. The walls 107 surrounding the passages are as thin as practical so as to minimize the profile of the first end wall 94. This in turn affords substantial access to the shroud region 47 of the blank 80 and thereby facilitates further machining of the shroud 47.

The clamping mechanism 106 may include an actuator 109, a sleeve 110 (FIG. 3), and a locking nut 111. The sleeve 110 (FIG. 3) is press fit into the second passage 107B. The actuator has a sliding pin 112 (FIG. 3) which extends into the sleeve 110. The locking nut 111 is threaded onto the actuator 109. The clamping mechanism 106 further includes a movable shaft 113 that extends into the sleeve 110 and attaches to the sliding pin 112 of the actuator 109. The actuator 109 is preferably a hydraulic type but any other suitable type may alternatively be employed, including but not limited to pneumatic, electromechanical, and manual types. The movable shaft 113 includes a bore 114 feature that mates with the conical shaped projection 82 on the blank 80. The bore 114 is preferably conical shaped.

The base 92 includes a lower surface 115 with transverse slots 116, 117 that may be used to accurately position the fixture 91 on a machine tool. A tooling hole 119 is used as reference feature in the fabrication of the base 92.

The fixture further includes an abutment 120 which is pivotally attached to the second end wall 96. Referring now to FIG. 4, the abutment 120 preferably includes a substantially wedge-shaped projection 121 having upper and lower surfaces 122, 124, which converge toward an edge 126. The angle between the upper and lower surfaces 122, 124 of the wedge 121 allows the wedge to register with the second locator 84 of the blank 80. The upper surface 122 includes a rectangular projection 127 shaped to mate with the rectangular shaped notch 86 of the blank 80. The rectangular projection includes opposite side surfaces 128 and an upper surface 129.

Referring again to FIG. 2, the conical bore 114 and the edge 126 of the wedge 121 form an insertion axis I that is parallel to the upper surface 97 of the base 92. The rectangular projection 127 (FIG. 4) lies on the insertion axis I, preferably such that the side surfaces 128 (FIG. 4) of the rectangular projection 127 (FIG. 4) are equidistant from the insertion axis I.

In this embodiment, the instrumentality for pivotally attaching the abutment 120 to the second end wall 96 includes a stage 130. Referring now to FIG. 3, the stage 130 is secured to the second end wall 96, in a recess 132 (FIG. 3) between a pair of vertical walls 134, 136. The stage 130 includes an upper surface 138, and a cavity 140. The cavity 140 is bounded by side walls 142, 144 and a bottom surface 146. The side walls 142, 144 preferably meet at a corner 148 and are preferably angled such that the diameter at the top of the cavity 140 is smaller than that at the bottom of the cavity.

The abutment 120 includes a lower surface 150 and a pivot projection 152. In assembling the fixture, the abutment 120 is positioned on the stage 130 such that the lower surface 150 of the abutment 120 is positioned on the upper surface 138 of the stage 130 and the pivot 152 is positioned in the cavity 140. The pivot 152 preferably has a substantially dovetail-like shape with a circular base 155 and a major outer surface 154 obliquely angled relative to a pivot axis 153 (FIG. 4) in order to mate with the side walls 142, 144 of the cavity 140. This configuration not only enables the abutment 120 to pivot about the pivot axis 153 but also assists in keeping the abutment 120 and the stage 130 in contact with each other when longitudinal forces are applied to the wedge. Referring now to FIG. 4, the pivot axis 153 is preferably substantially perpendicular to the upper surface 97 of the base 92 such that points on the wedge 121 travel parallel to the upper surface 97 of the base as the wedge projection 121 pivots about the pivot axis 153. The pivot axis 153 is preferably equidistant to the opposite side surfaces 128 of the rectangular projection 127 and more preferably passes through a center point 156 on the upper surface 129 of the rectangular projection 127. This enables the abutment 120 to pivot without disturbing the lateral position of the rectangular projection 127. The center point (relative to the upper surface) of the rectangular projection preferably remains on the insertion axis.

Referring again to FIG. 3, the stage further includes two sets of holes 158, 160 and a tab 162. A pair of bolts 163 with threaded ends extend through one of the pair 158 of holes and into the second end wall 96 to secure the stage 130 to the second end wall 96. The tab 162 extends from the stage 130 to help prevent the stage 130 from sliding when subjected to longitudinal forces. A pair of clamp screws 164 extend through and protrude from openings 166 (FIG. 3) in one of the upright walls to forcibly position the stage 130 against the other 136 of the upright walls.

The abutment 120 further includes an upper surface 170, and a pair of counterbored holes 172. Each of the counterbored holes 172 is bounded by an inner wall 174 and a counterbored surface parallel to the upper surface 170. A pair of bolts 176 extend through the counterbored holes 172 in the abutment and the holes 160 in the stage 130 to retain the wedge 121 to the stage 130. Each bolt 176 is tightened until the head of the bolt forces an associated compressible O-ring 178 into contact with the counterbored surface. This effectively forces the abutment 120 into contact with the stage 130 but does not prevent the abutment from pivoting relative to the stage. Clearances between the bolts 176 and the inner walls 174 ensure that there are no interference between them that would prevent the abutment 120 from pivoting.

The abutment 120 may further include a guide mechanism 180 that helps guide the rectangular shaped notch 86 of the blank into registration with the rectangular shaped projection 127 on the fixture. Despite tapering there may be little or no leeway for misalignment between the rectangular projection and the rectangular shaped notch. The guide mechanism 180 preferably comprises a movable guide pin 182 positioned in a longitudinal passage 184. The passage 184 has two ends, one is open, the other is blocked by a cover plate 186. An end 188 of the guide pin 182 protrudes from the open end of the passage 184. The open end of the passage is vertically aligned with the rectangular shaped projection 127, thereby positioning the guide pin 182 to mate with the lower portion of the rectangular shaped notch 86 on the blank. The protruding end 188 has a tapered tip with a diameter that is smaller in magnitude that the width of the rectangular shaped projection 127.

The guide mechanism 180 may be adapted to separate the blank 80 and the fixture 91 upon release of the clamping mechanism 106. To do this, the guide mechanism 180 may include a spring 192 disposed between the guide pin 182 and the cover plate 186. A portion of the resilient component may be recessed within the end 190 of the guide pin. Upon securing the blank 80 in the fixture 91 the back surface of the rectangular notch 86 makes contact with the guide pin 182 and pushes it further into the longitudinal passage 184, resulting in compression of the resilient component 192. Upon release of the clamping mechanism 106, the compressed resilient component 192 provides a force that in effect helps to push the blank 80 away from the fixture 91.

The base 92 may further include a platform 198 and an ejector 200. The platform 198 is disposed upon the upper surface 97 of the base 92 of the fixture, and preferably has a protruding ridge 202 that extends into the T-shaped slot 98. The platform 198 is shaped such that upon placing the blank upon the platform, the stacking axis S of the blank and the insertion axis I of the fixture are substantially aligned.

The ejector 200 includes a rotator mechanism 204, a support 206, and a shaft 208 extending between the rotator mechanism 204 and the support 206. The shaft 208 is engaged with the rotator mechanism 204 and the support 206, so that the rotator mechanism 204 rotates the shaft 208. The ejector 200 further includes two space arms 210 attached to the shaft. The support 206 may include holes 214 in register with holes 212 in the base 92 to aid in attachment of the ejector mechanism.

The operation of the fixture will now be discussed. The fixture 91 attaches to the support surface within a grinding machine (not shown) using conventional methods. Referring to FIG. 5, with the fixture 91 in the open position the blank 80 is placed between the end walls 94 and 96 of the fixture 91, upon the platform 198. Thus positioned, the actuator 109 of the clamping mechanism 106 is actuated so that the bore 114 of the shaft 113 moves along the insertion axis toward the second end wall 96. Referring to FIG. 6, the clamping mechanism is fully engaged with the blank when the bore 114 has fully engaged the conical projection 82, the wedge shaped notch 84 mates with the wedge shaped projection 121 and the rectangular shaped notch 86 mates with the rectangular shaped projection 127. The longitudinal clamping force causes the abutment 120 on the fixture to pivot about the pivot axis 153, to a position that provides the best possible orientation of the wedge shaped projection 121 for mating to the wedge shaped notch 84 on the blank. The wedge shaped notch 84 in combination with the wedge shaped projection 121 prevents the blank from rotating during machining. The conical projection 82 with the bore 114, and the rectangular shaped notch 86 with the rectangular shaped projection 127 prevents the blank from moving widthwise.

Figure 7:
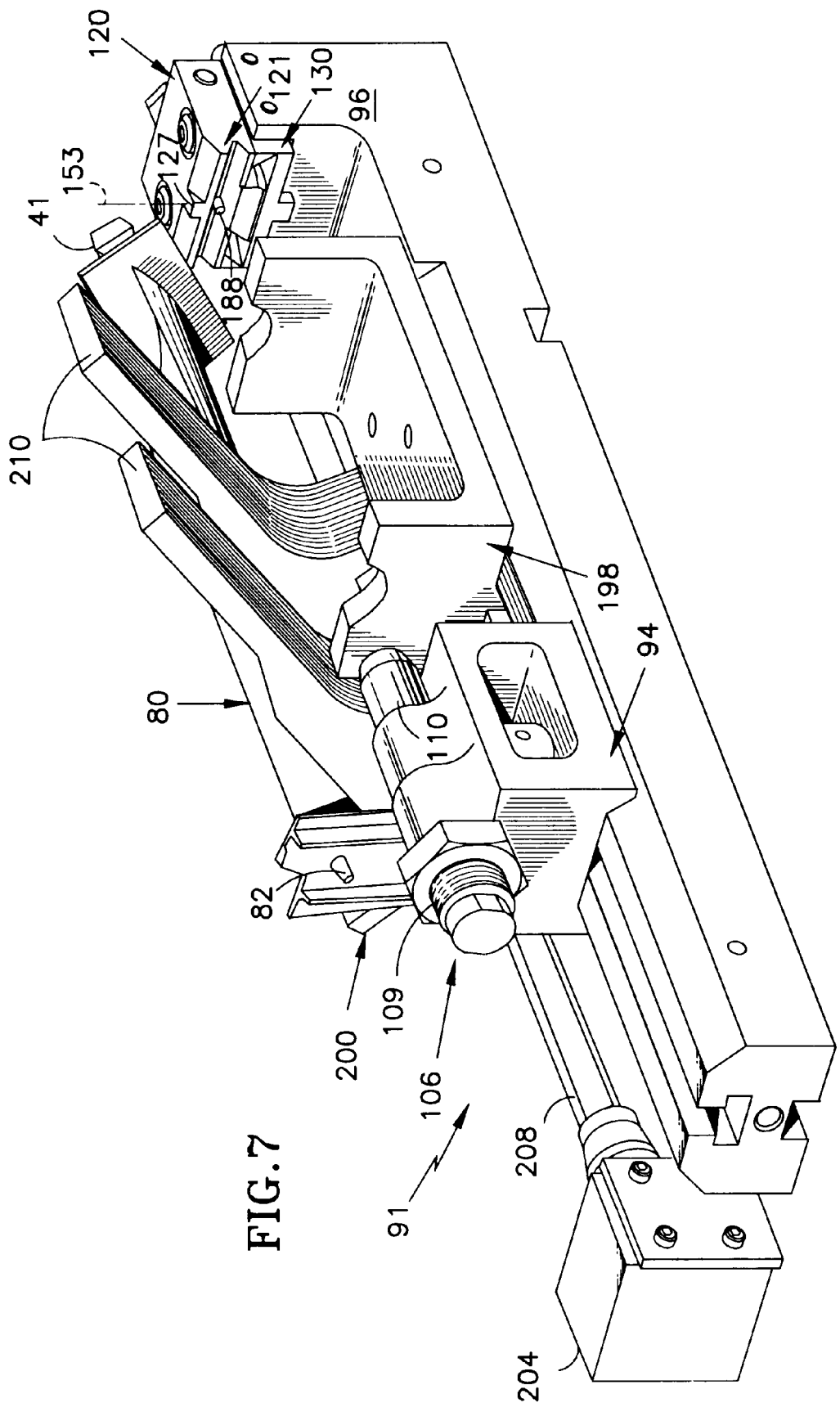
FIG. 7 is a perspective view of the fixture and the blank of FIG. 6 where the blank is being removed from the fixture by an ejector.

With the blade fixedly held in the fixture, the dove tails 41 can be ground into the first surface 63 of the sacrificial region 62 using conventional grinding machine operation techniques. Since the fixture references the stacking axis and the root centerline a programmable grinding machine can be used and is preferred. Referring to FIG. 7, once these dove tails are completed, the conical bore 114 is disengaged from the blank 80 and the ejector 200 is automatically activated. The rotator mechanism 204 causes the shaft 208 to rotate and consequently, the arms 210 lift the blade out of the platform 198. Then, the blank is rotated and placed in a similar fixture, so that the second surface 64 is facing upward. Thus positioned, additional dove tails can be ground into the second surface 64 of the sacrificial region 62. Additional features can be ground into the blank, such as notches in the shroud or platform. Then the sacrificial region 62 is removed, thus removing the second and third locators 84 and 86. The projection 82 may then be machined off of the shroud 47.

Because the abutment 120 is pivotally attached to the second end wall 96, the wedge projection 121 is better able to mate with the notch locator 84 in the event that the notch 84 is not perfectly positioned on the blank, e.g., not perfectly aligned with the root centerline C, i.e., not perfectly perpendicular to the stacking axis S. As a result, the fixture is able to secure the blank while imparting less force in the longitudinal direction than that imparted by the previous fixture. In one instance, the required force was reduced by 75%, from 220 pounds to 58 pounds. The use of less longitudinal clamping force reduces the likelihood that the blank will be distorted when it is secured in the fixture, and thereby reduces the likelihood of misalignment of subsequently machined features. In the best mode embodiment, this is accomplished without disturbing the positioning or mating of the other locators, thereby ensuring that the blank is positioned as desired within the fixture.

While a particular invention has been described with reference to illustrated embodiments, various modifications of the illustrative embodiments, as well as additional embodiments of the invention, will be apparent to persons skilled in the art upon reference to this description without departing from the spirit and scope of the invention, as recited in the claims appended hereto. Thus, the base need not have a sliding wall and may instead be integral. Furthermore, the platform and the ejector allow the process to utilize automated clamping with little operator interaction, however these features are optional. Although the present invention is disclosed with respect to securing a blank having locators in a sacrificial region, the locators on the blank need not be located in a sacrificial region. Nor is the present invention limited to use for subsequent machining. For example, the fixture may also be used to secure the blank for subsequent measurement. Locators may be protrusions or indentations so long as the associated features on the fixture are adapted accordingly. Placement of the locators may be changed, so that the same or another design reference axis or planes are used instead of the stacking axis or the root centerline, the fixture can be modified to complement the blank. It is therefore contemplated that the appended claims will cover any such modifications or embodiments that fall within the true scope of the invention.

I claim:

1. A method comprising:
   providing a blank having a first locator and a second locator spaced therefrom;
   providing a fixture having a base with end walls being spaced apart to accommodate said blank therebetween, said fixture further having a clamping mechanism for holding said blank, said clamping mechanism being supported by a first of said end walls, and further including an abutment being supported by a second end wall, wherein at least one of said clamping mechanism and said abutment is free to pivot in relation to the end wall that supports it; and
   securing said blank into said fixture wherein said clamping mechanism mates with said first locator and forces said second locator into contact with said abutment.

2. The method of claim 1, wherein said abutment is pivotally attached to said second end wall.

3. The method of claim 2, wherein the first locator has a substantially conical shape.

4. The method of claim 3, wherein said abutment includes a substantially wedge shaped feature that pivots about a pivot axis and mates with the second locator on the blank.

5. The method of claim 4, wherein said abutment pivots about a pivot with said pivot having a major outer surface that is at a substantially oblique angle relative to said pivot axis.

6. The method of claim 2, wherein said abutment includes a substantially wedge shaped feature that pivots about a pivot axis and mates with the second locator on the blank.

7. The method of claim 2, wherein said abutment pivots about a pivot with said pivot having a major outer surface that is at a substantially oblique angle relative to a pivot axis.

8. The method of claim 7, wherein said pivot has a substantially dovetail shape.

9. The method of claim 2, wherein said blank further comprises a third locator and said clamping mechanism forces said third locator into contact with said abutment.

10. The method of claim 9, wherein said abutment further comprises a feature that mates with said third locator on said blank, and said feature has opposite side surfaces that are substantially equidistant from a pivot axis.

11. The method of claim 9, wherein said feature has a central point which lies on a pivot axis.

12. The method of claim 9, wherein the first locator has a substantially conical shape and said abutment includes a substantially wedge shaped feature that pivots about a pivot axis and mates with the second locator on the blank.

13. The method of claim 12, wherein said abutment further comprises a feature that mates with said third locator on said blank, said feature having opposite side surfaces that are substantially equidistant from said pivot axis and further having a central point which lies on said pivot axis.

14. The method of claim 13, wherein said pivot has a major outer surface that is at a substantially oblique angle relative to said pivot axis.

* * * * *